United States Patent [19]

Griph et al.

[11] Patent Number: 5,528,634
[45] Date of Patent: Jun. 18, 1996

[54] TRAJECTORY DIRECTED TIMING RECOVERY

[75] Inventors: Richard S. Griph, Chandler; Albert H. Higashi, Gilbert, both of Ariz.

[73] Assignee: Motorola, Inc., Schaumburg, Ill.

[21] Appl. No.: 154,057

[22] Filed: Nov. 18, 1993

[51] Int. Cl.[6] .................................................. H04L 7/00
[52] U.S. Cl. ........................ 375/354; 375/355; 327/161
[58] Field of Search .................................. 375/106, 120, 375/118, 355, 371; 327/141, 155, 156, 158, 159, 161; 370/100.1, 108

[56] References Cited

U.S. PATENT DOCUMENTS

| | | | |
|---|---|---|---|
| 3,696,203 | 10/1972 | Leonard | 178/88 |
| 4,017,798 | 4/1977 | Gordy et al. | 325/42 |
| 4,096,442 | 6/1978 | McRae et al. | 375/323 |
| 4,365,338 | 12/1982 | McRae et al. | 375/12 |
| 4,466,108 | 8/1984 | Rhodes | 375/83 |
| 4,653,053 | 3/1987 | Pelchat | 371/43 |
| 4,805,191 | 2/1989 | Burch et al. | 375/106 |
| 4,815,103 | 3/1989 | Cupo et al. | 375/106 |
| 4,847,880 | 7/1989 | Kamerman et al. | 375/106 |
| 4,849,991 | 7/1989 | Arnold et al. | 375/84 |
| 4,866,739 | 9/1989 | Agazzi et al. | 375/106 |
| 5,068,628 | 11/1991 | Ghoshal | 331/1 A |
| 5,132,963 | 7/1992 | Ungerboeck | 370/32.1 |
| 5,159,291 | 10/1992 | Ghoshal | 331/1 A |
| 5,168,507 | 12/1992 | Crithlow et al. | 375/13 |
| 5,353,312 | 10/1994 | Cupo et al. | 375/106 |

*Primary Examiner*—Stephen Chin
*Assistant Examiner*—Huong Luu
*Attorney, Agent, or Firm*—Frederick M. Fliegel

[57] ABSTRACT

In a digital demodulator (10) a single sampling moment (28) occurs within each symbol (22). A data estimator (34) identifies a data code and a phase error for each symbol. The data from three symbols (22) are compared to identify whether a phase trajectory is determinate or indeterminate. The phase error from a current symbol is combined with phase trajectory direction data to determine whether a current phase error is in a direction of a next data code or a previous data code. When determinate trajectories are found, phase errors in the direction of a next data code urge the sample moment (28) to occur earlier in the symbols (22) and phase errors in the direction of a previous data code urge the sample moment (28) to occur later in each symbol (22). When indeterminate trajectories are found, substantially no influence is exerted over the timing of the sample moment (28).

22 Claims, 3 Drawing Sheets

TRAJECTORY DIRECTED TIMING RECOVERY

LICENSE RIGHTS

The U.S. Government has a paid-up license in this invention and the right in limited circumstances to require the patent owner to license others on reasonable terms as provided for by the terms of a contract with the U.S. Government.

TECHNICAL FIELD OF THE INVENTION

The present invention relates generally to digital demodulators. More specifically, the present invention relates to timing recovery loops used by digital demodulators to establish symbol framing.

BACKGROUND OF THE INVENTION

Digital demodulators extract digital data from a carrier signal. Numerous modulation schemes are known to those skilled in the art, and digital demodulators extract digital data using a technique which complements the modulation scheme. Many modulation schemes convey digital data as relative phase relationships between in-phase (I) and in-quadrature (Q) components of the carrier signal. At one instant in time the phase relationship conveys a first digital code, then the phase relationship changes so that at a second instant in time the phase relationship conveys a second digital code. The duration between these instants in time is referred to as a baud interval, baud, symbol interval, or symbol. A digital demodulator needs to identify these instants in time so that the phase relationships may be examined primarily at these instants and not at instants when the phase relationships are transitioning between data codes. If the examination or decision point within the symbols is not held at close to an optimum point, excessive bit error rates may result.

Symbol framing or timing recovery loops typically examine the data codes extracted from the carrier signal and/or other signals derived from the carrier signal to define symbol framing. Conventional timing recovery loops take samples both at decision points within symbols and at zero-crossing points approximately half-way between the decision points. Decision points are adjusted based upon differences between the occurrences of actual zero-crossing points and zero-crossing points which are predicted based upon the current decision points.

Conventional timing recovery loops suffer from numerous problems. Conventional timing recovery loop techniques lead to excessive circuit complexity, particularly when adapted to higher order modulation formats. The excessive complexity leads to increased costs, increased power consumption, and reduced reliability. One factor which leads to excessive complexity is the need to obtain at least two samples per symbol. This requires a digitizer to either operate at twice the symbol rate or include multiple synchronized digitizers. If a digitizer operates at twice the symbol rate, then the demodulator is limited to handling a symbol rate of only one-half the rate supported by the digitizer's processing technology. If multiple synchronized digitizers are used, then difficult and error prone alignment procedures must be performed to precisely synchronize the timing.

Furthermore, the timing of a zero crossing point has only an approximate relationship with an optimum decision point. A prediction for when a zero crossing point should occur is typically based upon the assumption that the zero crossing point should occur half-way between optimum decision points. This assumption is not precisely correct. Input filtering may distort the timing of zero crossing points so they do not occur precisely half-way between optimum decision points. Consequently, conventional timing recovery loops introduce the errors associated with predicting zero crossing points into the timing of decision points.

SUMMARY OF THE INVENTION

Accordingly, it is an advantage of the present invention that an improved timing recovery method and apparatus that determines symbol framing based only upon the same symbol sampling moments that are used as decision points is provided.

Another advantage is that the present invention requires no additional samples per symbol beyond those required to determine data conveyed by a carrier signal.

Another advantage is that the present invention may be implemented using simple circuits, even in connection with higher order modulation modes.

The above and other advantages of the present invention are carried out in one form by a method for recovering symbol timing from a signal that conveys discrete predetermined data codes in a stream of symbols. The method calls for sampling the signal at a symbol sampling moment within each symbol. In response to this sampling, a sample is obtained during each of the first, second, and third symbols, respectively. A phase trajectory is determined for the signal during the second symbol in response to the first, second, and third samples. The symbol sampling moment is adjusted in response to the phase trajectory.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
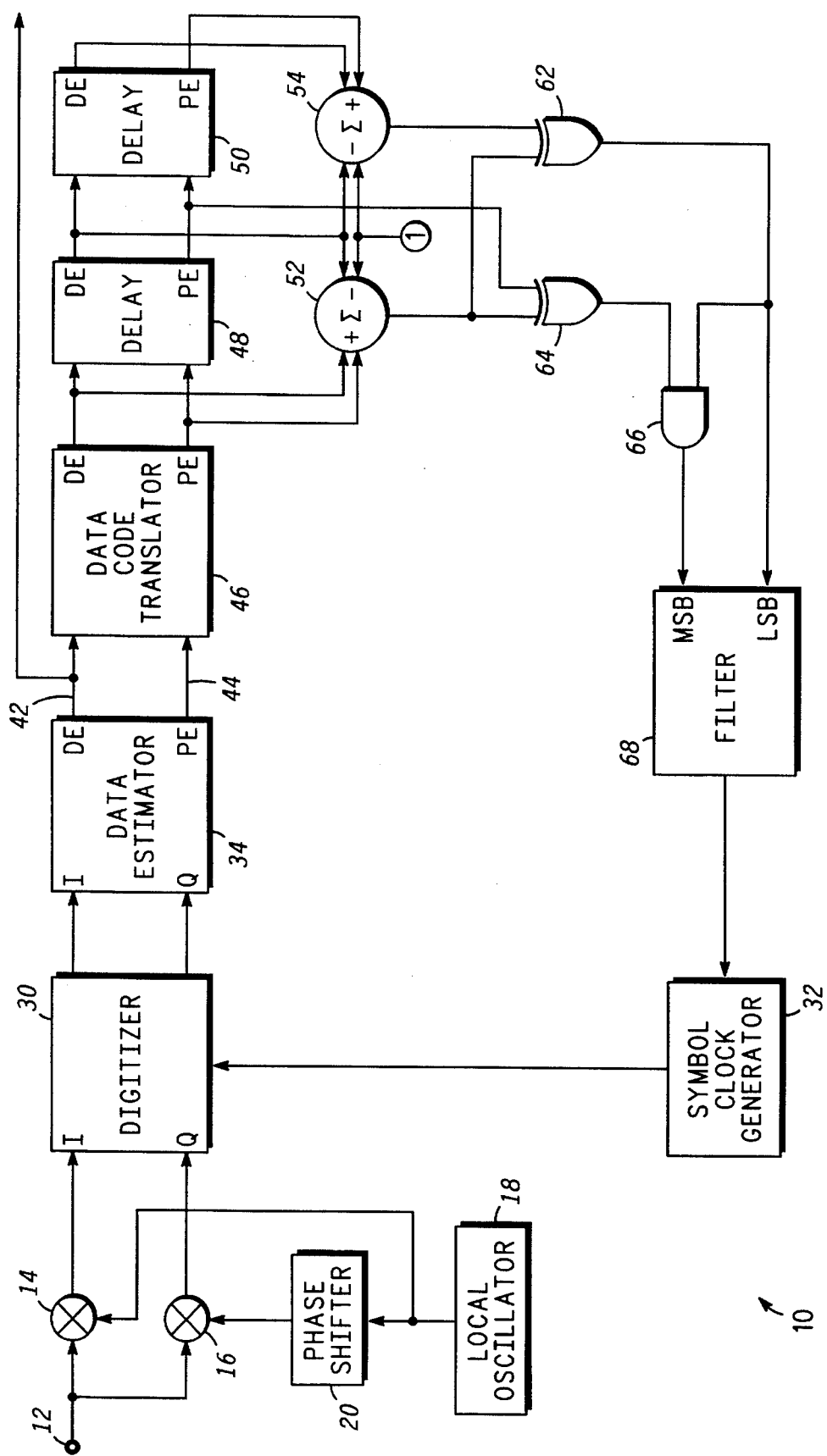
FIG. 1 is a block diagram of a demodulator having a trajectory directed timing recovery loop configured in accordance with the teaching of the present invention.

FIG. 1 is a block diagram of a digital demodulator 10. An input 12 of demodulator 10 receives a signal that has been modulated to convey discrete predetermined data codes. The present invention may be adapted to a wide variety of modulation formats. While the embodiments discussed below specifically refer to 8PSK modulation, those skilled in the art can easily adapt the teaching presented herein to other modulation formats.

Input 12 couples to first inputs of mixers 14 and 16, respectively. A local oscillator 18 has an output which couples to a second input of mixer 14 and to an input of a 90° phase shifter 20. Phase shifter 20 has an output coupled to a second input of mixer 16. Mixers 14 and 16 respectively generate I and Q baseband signals which correspond to in-phase (I) and in-quadrature (Q) components of the input signal.

Figure 2:
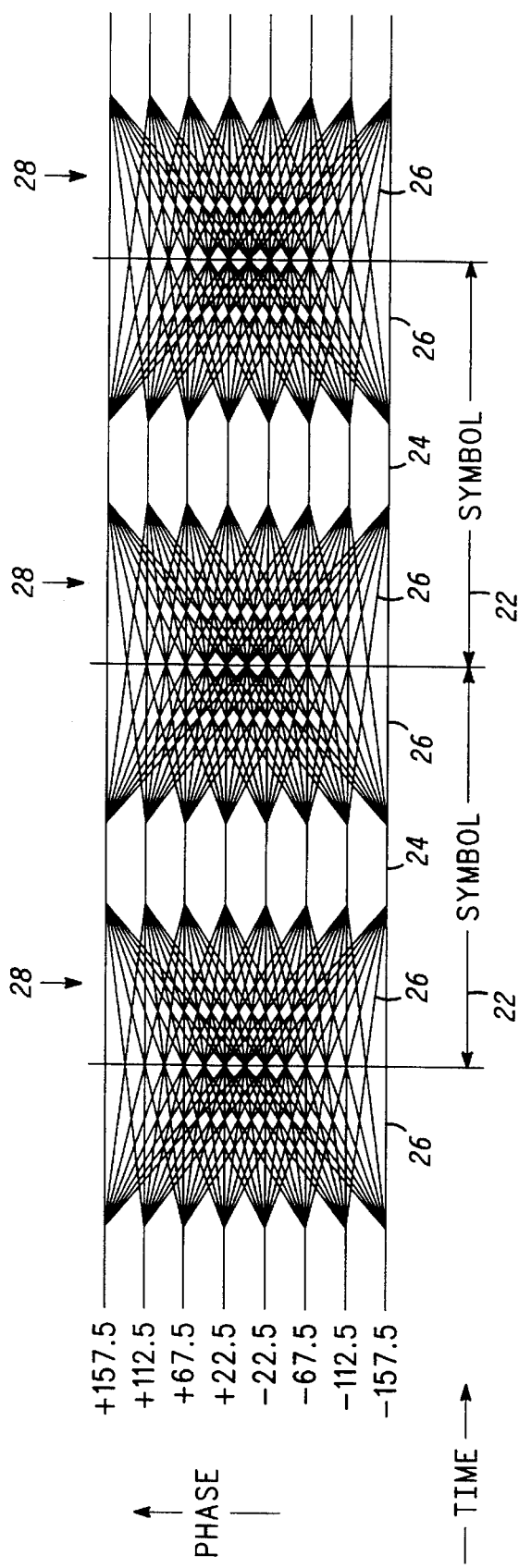
FIG. 2 is a trellis diagram showing potential phase trajectories for an 8PSK modulation format over a plurality of symbols.

In the preferred embodiments, the discrete predetermined data codes conveyed by the input signal are expressed as relative phases between these I and Q components of the input signal. FIG. 2 is a trellis diagram depicting potential changes between these relative phases. With reference to FIG. 2, one data code is conveyed every symbol 22. In the 8PSK example depicted in FIG. 2, each data code is expressed as one of eight potential phase relationships between I and Q components. These phases are assigned "ideal" values of ±22.5°, ±67.5°, ±112.5°, and ±157.5° in the example depicted in FIG. 2. These values are considered ideal values because they are the phase values used in modulating the input signal. On the other hand, the actual values detected at demodulator 10 (FIG. 1) may differ from the ideal values.

During each symbol 22, the I and Q components of the input signal are characterized by an eye opening interval 24, in which the phase between I and Q components exhibits one of the assigned values, and transition intervals 26, in which the phase between I and Q components transitions between the assigned values. Demodulator 10 samples I and Q components during a brief sampling moment 28 within each symbol 22. Desirably, sampling moment 28 occurs during eye opening interval 24 so that demodulator 10 decides which data codes are being conveyed in response to eye opening phase values rather than transitional phase values. This timing minimizes bit error rates. However, in the example depicted in FIG. 2 sampling moment 28 is occurring early within each symbol 22. Demodulator 10 incorporates a timing recovery loop (discussed below) which adjusts the timing for sampling moment 28 within each symbol 22 and holds sampling moment 28 in eye opening interval 24.

Referring back to FIG. 1, the outputs of mixers 14 and 16 couple to I and Q inputs, respectively, of a digitizer 30. However, those skilled in the art will appreciate that appropriate filtering (not shown) may be inserted between the mixers and digitizer 30. Digitizer 30 obtains samples of the I and Q components of the input signal. The I and Q samples are generated in response to a clock signal provided by a symbol clock generator 32. One set of I and Q samples are generated for each symbol 22 (FIG. 2). The set of samples is taken during sampling moment 28 (FIG. 2). The clock signal oscillates at a frequency around the input signal symbol rate. Clock generator 32 may be a voltage controlled oscillator or other circuit whose frequency can be externally controlled. In order to move sampling moment 28 later within each symbol 22, as depicted in FIG. 2, clock generator 32 is controlled to slightly reduce the oscillation frequency of its output clock signal.

I and Q outputs of digitizer 30 couple to I and Q inputs, respectively, of a data estimator 34. Data estimator 34 receives one set of I and Q samples each symbol 22. This set of samples is converted into an estimate of the data code conveyed by the phase relationship between the I and Q components during sampling moment 28.

Figure 3:
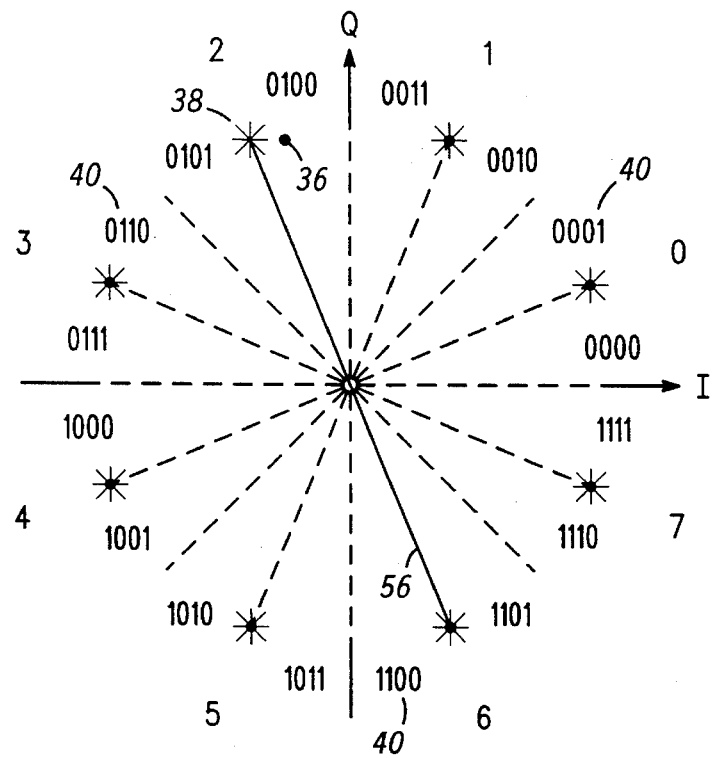
FIG. 3 is a first phase node diagram for an 8PSK modulation format.

FIG. 3 is a phase node diagram for an 8PSK modulation example. The eight ideal phases which convey data codes are associated with the numbers 0–7 in FIG. 3. These ideal phases have the phase values of ±22.5°, ±67.5°, ±112.5°, and ±157.5° in this example Referring to FIGS. 1 and 3, data estimator 34 identifies the one of the numbers 0–7 whose corresponding ideal phase is closest to the actual phase expressed in the I and Q samples. For an actual phase of around +105°, as depicted at a point 36 in FIG. 3, data estimator 34 determines that ideal point 38, corresponding to an ideal phase of +112.5° is closest, and that data code "2" is being conveyed.

In addition, data estimator 34 desirably generates phase error data which characterize the difference between actual and ideal phases. This phase error data is occasionally referred to as soft decision data. In the preferred embodiments, only one bit of phase error data is generated. This one bit indicates whether the actual phase, such as that indicated by actual point 36, has a positive or negative phase relative to the ideal phase, such as that indicated by ideal point 38. A positive phase difference results when the actual phase is rotated counterclockwise from the ideal phase, and a negative phase difference results when the actual phase is rotated clockwise from the ideal phase.

Thus, data estimator 34 may produce four bits of data for each symbol 22 in the 8PSK example. The three most significant of these four bits define the conveyed data code, and the least significant bit characterizes the phase error. As illustrated in FIG. 3, this four bit output identifies within which one of sixteen sectors 40, bearing binary labels 0000–1111 in FIG. 3, actual phase point 36 resides. In the example depicted in FIG. 3, actual point 36 resides in sector 0100. The three most significant bits of this sector value correspond to the data estimate (010), and the least significant bit (0) corresponds to the phase error. The data estimate may serve as an output of demodulator 10. When appropriate, the soft decision data may be combined with the data estimate (not shown) as an output from demodulator 10.

A data estimate (DE) output 42 and a phase error (PE) output 44 of data estimator 34 may couple to corresponding data estimate and phase error inputs of an optional data code translator 46. Translator 46 insures that data codes assigned to sectors 40 of the phase node diagram are ranked corresponding to phase. In other words, translator 46 insures that binary data codes increase and decrease in value to correspond to ideal phase value increase and decrease. FIG. 3 illustrates such a ranked binary assignment. As phase increases from −180° to +180°, the data codes correspondingly assigned to sectors 40 increase from a binary value of −8 (1000) to a binary value of +7 (0111). Thus, if data estimator 34 assigns ranked binary data codes to sectors 40 as illustrated in FIG. 3, data code translator 46 may be omitted.

On the other hand, various modulation schemes use alternate coding techniques that do not rank data codes assigned to sectors 40. A Gray code represents one example. In these situations, data code translator 46 is included to translate the alternate coding scheme into ranked binary data codes. Alternatively, this translating operation may also be combined with difference circuits 52, 54 and/or logic gates 62, 64.

A data estimate output of data code translator 46 couples to a data estimate input of a delay stage 48, and a phase error output of data code translator 46 couples to a phase error input of delay stage 48. Delay stage 48 delays the sector data code, discussed above, by one symbol 22. Likewise, a data estimate output of delay stage 48 couples to a data estimate input of a delay stage 50, and a phase error output of delay stage 48 couples to a phase error input of delay stage 50. Delay stage 50 also delays the sector data code by one symbol 22.

During each symbol 22, three sector data codes are present at the outputs of translator 46, delay stage and delay stage 50. A "previous" sector data code is present at the output of delay stage 50. A "current" sector data code from the symbol 22 occurring immediately after the "previous" symbol is present at the output of delay'stage 48, and a "next" sector data code from the symbol 22 occurring immediately after the "current" symbol is present at the output of translator 46.

These next and previous sector data codes, including the data estimate and the phase error, are routed to plus inputs of difference circuits 52 and 54, respectively. The data and error bits are combined with the data bits being the MSBs and the error bit being the LSB. The data estimate from the current sector data code is combined, as the most significant bits, with a constant binary "1", as a least significant bit, and routed to minus inputs of difference circuits 52 and 54.

Difference circuits 52 and 54 compare the relative phase relationships of the next and previous symbols 22 with the phase of the current symbol 22. These comparisons are performed to identify a phase trajectory during the current symbol 22. The removal of phase error data from the current sector data code causes the comparison to be performed against the ideal phase value rather than the actual phase value. The inclusion of the constant binary "1" has the effect of rotating the phase node constellation illustrated in FIG. 3 one sector clockwise. This rotation simplifies subsequent comparisons.

Due to the above-discussed constellation rotation, the outputs of difference circuits 52 and 54 need to convey only one bit each. The one bit desirably corresponds to the most significant bit of the respective subtraction operation performed by difference circuit 52 or 54. This one bit generally indicates whether the phase difference resides in a positive or negative direction from the current ideal phase vector, such as vector 56 illustrated in FIG. 3. The positive direction occurs when the next or previous sector data code resides between 0° and +180° from the current data estimate. The negative direction occurs when the next or previous sector data code resides between 0° and −180° from the current data estimate.

Figure 4:
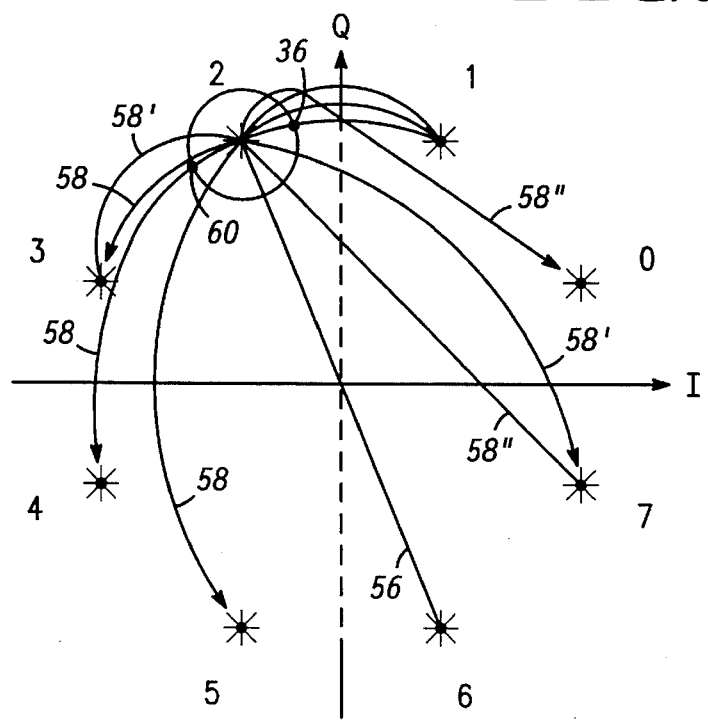
FIG. 4 is a second phase node diagram for an 8PSK modulation format.

FIG. 4 is another phase node diagram for an 8PSK modulation example. Referring to FIG. 4, in an example where a current data estimate identifies data code "2", next data code sectors around data codes "3", "4", or "5" are in a positive direction while a previous sector data code around data code "1" is in a negative direction.

Referring to FIGS. 1 and 4, the outputs of difference circuits 52 and 54 together define a phase trajectory for the current symbol. When the previous data code is in a negative direction from the current data code and the next data code is in a positive direction from the current data code, a counterclockwise trajectory 58 is defined, as illustrated in three separate examples in FIG. 4. With a counterclockwise trajectory 58, if phase error on average over many symbols 22 is in the clockwise (negative) direction, sampling moment 28 (FIG. 2) is occurring too early in each symbol 22, and symbol timing should be advanced. This situation is depicted by actual point 36 in FIG. 4. On the other hand, with a counterclockwise trajectory 58, if phase error on average over many symbols 22 is in the counterclockwise (positive) direction, sampling moment 28 (FIG. 2) is occurring too late in each symbol 22, and symbol timing should be retarded. This situation is depicted by actual point 60 in FIG. 4.

FIG. 4 shows only a few potential phase trajectories for the sake of clarity. Three of these trajectories are depicted as being in a counterclockwise direction. However, for the 8PSK example 512 unique trajectories 58 may be followed in transitioning from a previous data code, through a current data code, to a next data code. Some of these trajectories, such as trajectory 58' are in a clockwise direction. When the previous data code is in a positive direction from the current data code and the next data code is in a negative direction from the current data code, a clockwise trajectory 58' is defined. With a clockwise trajectory 58', if phase error on average over many symbols 22 is in the positive direction, sampling moment 28 (FIG. 2) is occurring too early in each symbol 22, and symbol timing should be advanced. On the other hand, with a clockwise trajectory 58' if phase error on average over many symbols 22 is in the negative direction, sampling moment 28 (FIG. 2) is occurring too late in each symbol 22, and symbol timing should be retarded.

In the present invention, counterclockwise trajectories 58 and clockwise trajectories 58' are considered to be determinate trajectories. These determinate trajectories are distinguished from indeterminate trajectories, an example of which is illustrated by trajectory 58". Indeterminate trajectories 58" occur when both previous and next data codes are in either a positive or negative direction from the current data code. Indeterminate trajectories 58" are distinguished from determinate trajectories 58 and 58' because phase error for the current data code does not reliably indicate early or late timing in indeterminate trajectories 58".

A special situation results when either or both of the previous and next data codes has either the same phase as the current data code or the current phase plus 180°. These situations actually represent examples of indeterminate trajectories 58" because current phase error does not reliably indicate early-late symbol timing. On the other hand, detection of such situations increases complexity, and the failure to detect such situations has little impact on the operation of the timing recovery loop. The minor impact results, at least in part, because such situations may be recognized as having counterclockwise or clockwise trajectories depending on phase errors. Thus, the frequency of such situations being recognized as counterclockwise trajectories approximately equals the frequency of such situations being recognized as clockwise trajectories. Since the timing implications of counterclockwise and clockwise trajectories are opposite one another, over the course of many symbols the influence of these indeterminate situations averages to zero. Accordingly, in the preferred embodiment, such situations are intentionally treated as determinate trajectories to simplify the design of demodulator 10.

For the polarities indicated with the examples discussed herein, when difference circuits 52 and 54 output a "1" value, a negative phase relative to the current data code is indicated, and when difference circuits 52 and 54 output a "0" value a positive phase relative to the current data code is indicated. When these difference circuits output the same value, an indeterminate trajectory 58" is indicated. When these difference circuits output different values, a determinate trajectory 58 or 58' is indicated.

The outputs of difference circuits 52 and 54 couple to inputs of an Exclusive Or (XOR) circuit 62. XOR circuit 62 compares the difference circuits' outputs to determine whether the phase trajectory in the current symbol is determinate or indeterminate. For the polarities indicated with the examples discussed herein, a "1" output from circuit 62 signifies a determinate trajectory, which may be either a counterclockwise trajectory 58 or a clockwise trajectory 58'. A "0" output signifies an indeterminate trajectory 58".

The output of difference circuit 52 and the phase error from the current sector data code couple to inputs of an XOR circuit 64. For the polarities indicated with the examples discussed herein, a "1" output from difference circuit 52 signifies a clockwise trajectory 58' and a "0" output from difference circuit 52 signifies a counterclockwise trajectory 58. XOR circuit 64 compares the trajectory data from difference circuit 52 with the phase error data to resolve whether the phase error is in the direction of the next or previous data code relative to the current data code. If the phase error is in the direction of the next data code, then sampling moment 28 (FIG. 2) is occurring too late, and sampling moment 28 should be moved earlier in each symbol 22. If the phase error is in the direction of the previous data code, then sampling moment 28 is occurring too early, and sampling moment 28 should be moved later in each symbol 22. For the polarities indicated with the examples discussed herein, a "1" output from XOR circuit 64 signifies a situation where sampling moment 28 is occurring too late, and sampling moment 28 should be moved earlier in each symbol 22. A "0" signifies a situation where sampling moment 28 is occurring too early, and sampling moment 28 should be moved later in each symbol 22.

The output of XOR circuit 62 couples to a first input of AND circuit 66 and to a least significant bit (LSB) input of a filter 68. Filter 68 may be implemented as a digital filter or may be an analog filter having a digital-to-analog converter coupled to inputs MSB and LSB of filter 68. An output of XOR circuit 64 couples to a second input of AND circuit 66, and an output of AND circuit 66 couples to a most significant bit (MSB) input of filter 68. The LSB and MSB inputs of filter 68 receive a loop gain value for each symbol 22. This value is responsive to the phase trajectory at the symbol 22 and the phase error at the symbol 22. In accordance with the polarities indicated with the examples discussed herein, a loop gain value of "00" results from an indeterminate trajectory 58" and is equivalent to a zero. A loop gain value of "01", which is equivalent to +1, occurs when current phase error is in the direction of the previous data code and should be moved later in each symbol 22. A loop gain value of "11", which is equivalent to −1, occurs when current phase error is in the direction of the next data code and should be moved earlier in each symbol 22.

An output of filter 68 couples to a control input of symbol clock generator 32. Filter 68 outputs a value that responds to the average of loop gain values accumulated over many symbols. Positive loop gain values urge filter 68 to instruct clock generator 32 to move sampling moment 28 later in each symbol 22. Negative loop gain values urge filter 68 to instruct clock generator 32 to move sampling moment 28 earlier in each symbol 22. Loop gain values of zero have substantially no influence on timing adjustments. Of course, through filter 68 the loop gain for any one symbol 22 may not significantly influence symbol timing. Rather, one symbol's loop gain value exerts a small influence which may, when accumulated with other like loop gain values, cause symbol timing change.

The present invention provides an improved method and apparatus for recovering symbol timing in a digital demodulator. Symbol timing is determined using only the same symbol sampling moments employed to provide demodulator data estimate outputs. No additional samples are required beyond those needed to determine which data codes are conveyed by a carrier signal. The present invention may be implemented using simple circuits, even in connection with higher order modulation modes.

The present invention has been described above with reference to preferred embodiments. Those skilled in the art recognize that changes in embodiments need not depart from the scope of the present invention, e.g., while this description discusses an 8PSK example, the teaching of the present invention can be adapted to other modulation schemes (i.e., PSK, QAM, FSK, etc.) having at least three constellation nodes. Likewise, the above description discusses particular implementation details. This adaptation may require changing error measurement and comparisons from phase to positional based operations and/or operating independent I and Q recovery loops, depending on modulation formats. Those skilled in the art may design alternate implementations practicing the present invention set. These and other changes obvious to those skilled in the art are intended to be included within the scope of the present invention.

What is claimed is:

1. A method for recovering symbol timing from a signal that conveys discrete predetermined data codes in a stream of symbols, said method comprising steps of:

sampling said signal at a symbol sampling moment within each symbol of said stream of symbols;

obtaining, in response to said sampling step, first, second, and third samples during first, second, and third symbols of said stream of symbols, respectively;

determining a phase trajectory for said signal during said second symbol of said stream of symbols in response to said first, second, and third samples; and adjusting said symbol sampling moment in response to said phase trajectory.

2. A method as claimed in claim 1 wherein relative phases between in-phase and in-quadrature components of said signal convey said data codes, and said method additionally comprises steps of:

estimating a one of said predetermined data codes which corresponds to said second sample to provide a data estimate;

generating a phase error to associate with said data estimate of said second sample; and resolving whether a direction of said phase error is towards said first or third sample relative to said data estimate.

3. A method as claimed in claim 2 wherein said adjusting step adjusts said symbol sampling moment in response to said phase trajectory and in response to said direction of said phase error.

4. A method as claimed in claim 3 wherein:

said adjusting step urges said symbol sampling moment earlier within each symbol when said phase error is in said direction of said third sample relative to said data estimate; and said adjusting step urges said symbol sampling moment later within each symbol when said phase error is in said direction of said first sample relative to said data estimate.

5. A method as claimed in claim 2 wherein said estimating step generates one data code from a set of at least three unique data codes.

6. A method as claimed in claim 2 wherein:

said obtaining step comprises a step of assigning values to said first, second and third samples, said values being ranked in correspondence with said relative phases; and said resolving step comprises a step of comparing said first sample with said data estimate of said second sample and said third sample with said data estimate of said second sample.

7. A method as claimed in claim 1 wherein:

said determining step determines whether said phase trajectory exhibits an indeterminate direction; and said adjusting step exerts substantially no influence on said symbol sampling moment in response to said indeterminate phase trajectory direction.

8. A method as claimed in claim 7 wherein:

relative phases between in-phase and in-quadrature components of said signal convey said data codes;

said determining step determines that said phase trajectory exhibits said indeterminate direction when said relative phases at both of said first and third samples are greater than a relative phase at said second sample and less than a relative phase at said second sample plus 180°; and said determining step also determines that said phase trajectory exhibits said indeterminate direction when said relative phases at both of said first and third samples are less than a relative phase at said second sample and greater than a relative phase at said second sample minus 180°.

9. A method as claimed in claim 1 wherein said second symbol occurs immediately after said first symbol in said stream of symbols, and said third symbol occurs immediately after said second symbol in said stream of symbols.

10. A method as claimed in claim 9 wherein:

said obtaining step obtains a fourth sample during a fourth symbol, said fourth symbol occurring immediately after said third symbol in said stream of symbols; and said determining step determines a phase trajectory for said signal during said third symbol in response to said second, third, and fourth samples.

11. A digital demodulating apparatus for recovering symbol timing from a signal that conveys discrete predetermined data codes in a stream of symbols, said apparatus comprising:

a clock generator;

a digitizer, coupled to said clock generator, for generating first, second, and third samples of said signal by sampling said signal at a symbol sampling moment within first, second, and third symbols of said stream of symbols respectively;

a comparison circuit, coupled to said digitizer, configured to determine a phase trajectory for said signal during said second symbol of said stream of symbols in response to said first, second, and third samples; and a filter, coupled to said comparison circuit and said clock generator, for adjusting said symbol sampling moment in response to said phase trajectory.

12. An apparatus as claimed in claim 11 wherein:

relative phases between in-phase and in-quadrature components of said signal convey said data codes;

said apparatus additionally comprises a data estimator, coupled to said digitizer, for estimating a one of said predetermined data codes which corresponds to said second sample, for providing a data estimate and for generating a phase error associated with said data estimate of said second sample; and said apparatus additionally comprises a second comparison circuit, coupled to said data estimator, for resolving whether a direction of said phase error is towards of said first or third sample relative to said data estimate.

13. An apparatus as claimed in claim 12 wherein said second comparison circuit couples to said filter so that said filter adjusts said symbol sampling moment in response to said phase trajectory and in response to said direction of said phase error.

14. An apparatus as claimed in claim 13 wherein:

said filter and said clock generator are configured to urge said symbol sampling moment earlier within each symbol when said phase error is in said direction of said third sample relative to said data estimate; and said filter and said clock generator are configured to urge said symbol sampling moment later within each symbol when said phase error is in said direction of said first sample relative to said data estimate.

15. An apparatus as claimed in claim 11 wherein:

said comparison circuit determines whether said phase trajectory exhibits an indeterminate direction; and said filter is configured to exert substantially no influence on said symbol sampling moment in response to a phase error associated with said indeterminate phase trajectory direction.

16. An apparatus as claimed in claim 15 wherein:

relative phases between in-phase and in-quadrature components of said signal convey said data codes;

said comparison circuit determines that said phase trajectory exhibits said indeterminate direction when said relative phases at both of said first and third samples are greater than the relative phase at said second sample and less than the relative phase at said second sample plus 180°; and said comparison circuit additionally determines that said phase trajectory exhibits said indeterminate direction when said relative phases at both of said first and third samples are less than the relative phase at said second sample and greater than the relative phase at said second sample minus 180°.

17. An apparatus as claimed in claim 11 wherein:

said second symbol of said stream of symbols occurs immediately after said first symbol in said stream of symbols, and said third symbol of said stream of symbols occurs immediately after said second symbol in said stream of symbols;

said digitizer generates a fourth sample of said signal during a fourth symbol of said stream of symbols, said fourth symbol of said stream of symbols occurring immediately after said third symbol in said stream of symbols; and said comparison circuit determines a phase trajectory for said signal during said third symbol of said stream of symbols in response to said second, third, and fourth samples.

18. A method for recovering symbol timing from a signal that conveys discrete predetermined data codes in a stream of symbols wherein relative phases between in-phase and in-quadrature components of said signal convey said data codes, said method comprising steps of:

sampling said signal at a symbol sampling moment within each symbol of said stream of symbols;

obtaining, in response to said sampling step, first, second, and third samples of said signal during first, second, and third symbols of said stream of symbols, respectively;

estimating a one of said predetermined data codes which corresponds to said second sample to provide a data estimate;

generating a phase error to associate with said data estimate of said second sample;

identifying one of determinate and indeterminate phase trajectories for said signal during said second symbol of said stream of symbols in response to said first, second, and third samples;

resolving whether a direction of said phase error is towards said first or third sample relative to said data estimate;

adjusting said symbol sampling moment in response to said phase error and said determinate phase trajectories; and refraining from substantially influencing said symbol sampling moment in response to said indeterminate phase trajectory.

19. A method as claimed in claim 18 wherein:

said adjusting step urges said symbol sampling moment earlier within each symbol when said phase error is in said direction of said third sample relative to said data estimate; and said adjusting step urges said symbol sampling moment later within each symbol when said phase error is in said direction of said first sample relative to said data estimate.

20. A method as claimed in claim 18 wherein:

said identifying step determines that said one of said determinate and indeterminate phase trajectories exhibits an indeterminate direction when said relative phases at both of said first and third samples are greater than a relative phase at said second sample and less than a relative phase at said second sample plus 180°; and said identifying step also determines that said one of said determinate and indeterminate phase trajectories exhibits said indeterminate direction when said relative phases at both of said first and third samples are less than a relative phase at said second sample and greater than a relative phase at said second sample minus 180°.

21. A method as claimed in claim 18 wherein:

said second symbol of said stream of symbols occurs immediately after said first symbol in said stream of symbols, and said third symbol of said stream of symbols occurs immediately after said second symbol in said stream of symbols;

said obtaining step obtains a fourth sample of said signal during a fourth symbol of said stream of symbols, said fourth symbol of said stream of symbols occurring immediately after said third symbol in said stream of symbols; and said identifying step identifies said one of said determinate and indeterminate phase trajectories for said signal during said third symbol of said stream of symbols in response to said second, third, and fourth samples.

22. A method as claimed in claim 18 wherein:

said estimating step comprises a step of assigning values to said data codes, said values being ranked in correspondence with said relative phases; and said resolving step comprises a step of comparing said first sample with said data estimate of said second sample and said third sample with said data estimate of said second sample.

\* \* \* \* \*